UNITED STATES PATENT OFFICE.

JAMES O. HANDY AND ROBERT M. ISHAM, OF PITTSBURGH, PENNSYLVANIA, ASSIGNORS, BY MESNE ASSIGNMENTS, TO ALLEN S. DAVISON COMPANY, OF PITTSBURGH, PENNSYLVANIA, A CORPORATION OF PENNSYLVANIA.

REFRACTORY AND PROCESS OF MAKING SAME.

1,270,818. Specification of Letters Patent. Patented July 2, 1918.

No Drawing. Application filed January 22, 1917. Serial No. 143,678.

*To all whom it may concern:*

Be it known that we, JAMES O. HANDY and ROBERT M. ISHAM, citizens of the United States, and residents of Pittsburgh, in the county of Allegheny and State of Pennsylvania, have invented certain new and useful Improvements in Refractories and Processes of Making Same, of which the following is a specification.

This invention relates to refractories and processes of making same; and it comprises, as a new refractory material, a basic material comprising lime and magnesia and having nearly the analytical composition of a calcined dolomite but differing therefrom in containing a little chlorin and in resisting slaking by the action of air, steam and hot water; and it also comprises a method of making such material wherein crushed or powdered dolomite is moistened with a solution of a soluble chlorid and calcined at a high temperature, the temperature and conditions of calcination being so chosen that not only is the carbon dioxid expelled but also the major portion of the chlorin of the chlorid added; all as more fully hereinafter set forth and as claimed.

In lining basic open hearth furnaces, the choice of materials offers many difficulties. A suitable material must of course bond in place to form a resistant lining layer but it must be refractory enough not to yield or soften under the heat; requirements which are in a measure contradictory. Further, it must resist the action of oxid of iron and of the lime used in treating the molten iron in such a furnace. A very good material is afforded by certain grades of imported magnesite containing just enough impurity to allow them to bond in the furnace. Pure magnesia is too refractory to bond. Calcined dolomite is largely used and gives a good lining, but unless calcined immediately before use, it slakes in keeping, taking up carbon dioxid and water from the air. Dolomite in its natural condition is a carbonated material, that is it contains carbon dioxid. On calcination the carbon dioxid is expelled, but on standing the calcines reabsorb carbon dioxid from the air and tend to revert to the original composition. The greater the amount of lime present, the quicker is this reabsorption. It cannot well be shipped, stored or handled without slaking more or less; and slaked material is not desirable for use in the furnace. Very good preparations which can be handled commercially are however made by impregnating or coating calcined "hard-burnt" dolomite granules with basic slag or the like; the purpose of the use of this material being not only to shield the dolomitic lime against slaking but also to give a more ready bonding action in the furnace than is afforded by untreated dolomite. Dolomite is composed of carbonate of magnesia and carbonate of lime in varying proportions, ranging all the way from material containing equimolecular proportions of the two carbonates to calcium carbonate admixed with but little magnesium carbonate. The word is here taken as including all these varieties, including the so-called magnesian limestones.

We have found that material very advantageous for lining basic open hearth furnaces and similar purposes can be made in another manner; such material withstanding the action of air and of water and giving a bond at the temperatures of the basic open hearth furnace which is resistant and mechanically strong.

We find that when dolomite is mixed with various chlorids and calcined in the presence of water vapor at a temperature high enough not only for calcination (that is the expulsion of the contained carbon dioxid) but also for the expulsion of most of the chlorin, the resulting calcines are highly refractory and are resistant to slaking. A temperature of about 1500° C. or 2700° F. with free gas circulation over or around the calcining material does very well. In order to obtain these conditions, it is found most advantageous to perform the calcination in a rotary kiln much like that used in making cement clinker but using firing means giving somewhat higher temperatures than those used in making clinker. Natural gas burning with sufficient excess of air to give rapid combustion is quite suitable for the present purposes; but powdered coal, sprayed oil, etc., may also be used. Superheated producer gas burning with heated air may also be used. Other types of furnace may be used. The presence of more or less water vapor is desirable but enough is usually contained in products of combustion from ordinary fuels.

Where crushed dolomitic or magnesian material is calcined with the right amount of chlorids and under the right conditions, the resistance to chemical action offered by the product is truly remarkable. It does not absorb moisture or carbon dioxid from the air and after soaking in water for several days, it may be dried out again without gain in weight or other evidence of slaking. Contact with a current of steam or boiling in water does not produce slaking. The product is very dense, and of high specific gravity, reaching as high as 3.41. Very little chlorin is left in the material, the amount ranging from 0.5 per cent. down to a few hundredths of one per cent. Usually, the amount is less than 0.1 per cent. In texture the product resembles, somewhat, crushed vitrified paving brick, and often has a slightly glazed appearance.

Various chlorids may be used, but it is found that calcium chlorid is on the whole best adapted for the present purposes. Magnesium chlorid works about as well; and it is possible to use various brines and bitterns containing these chlorids, the presence of the common salt not interfering. It is even possible to use common salt (chlorid of sodium), though calcium chlorid or magnesium chlorid is better. With calcium chlorid, there is ordinarily used about 10 per cent. of the weight of the material to be treated, although less or more may be used, employing it in the form of a solution of any convenient strength.

In a practical embodiment of the present invention the dolomitic or magnesian material is crushed to rather fine granules; the size of granule depending somewhat on the use to be made of the final product. For many purposes, a grain size so that the material will pass a 20 mesh sieve is convenient. The powdered material is next mixed with a solution of calcium chlorid, which need not be pure; the amount of solution taken being such as will give an amount of calcium chlorid about equal to 10 per cent. of the weight of the powdered material. Ordinarily there is used a strong solution, with merely the amount of water which will suffice to make the whole mass into a mud or paste. The mixture is then dried, which makes it quite firmly coherent. It may be broken up and furnaced in the form of fragments; or it may be granulated. Ordinarily it is broken up into granules of convenient size and passed through a rotary kiln of the type previously described. In its progress through the kiln the material is exposed to a temperature of about 1500° C. while in contact with the flame and flame gases passing through the kiln. It gradually calcines and becomes more and more dense, giving off vapors of HCl which pass off harmlessly with the flame gases. It is discharged from the end of the kiln as a sintered material of a physical character depending upon the conditions. It may be discharged as a granular mass or as open textured bodies of agglomerated granules. When it is roasted or calcined in stationary types of furnaces or kilns, it is finally removed in more or less cake-like bodies which may however be readily broken up into granular form. For lining, patching and repairing furnaces, a granular form is convenient.

The material produced as just described is very well adapted for lining basic open hearth furnaces and for many similar purposes.

It has been found that this material may also be readily converted into bricks and blocks adapted for use in various relations where a basic, highly refractory but permanent material in shaped form is required. The granules produced as just described may be mixed with oil or tar or other suitable temporary binder and shaped into the form desired as by pressing in a brick machine. The shaped articles are then burnt to remove the temporary binder and bond the granules together, the temperature finally reaching 1500° C. or above to produce surface union between the granule faces.

The products produced according to the present invention will withstand boiling water and steam and are not affected by fire gases. They may be shipped and handled and stored indefinitely without fear of deleterious change.

The material will bond well at the temperatures of open hearth furnaces, say, about 1600° C., but its fusion point is much higher, being well above "cone" 35, or say, 1940° C., when dolomitic limestone is used, or about 2800° C. when magnesia is used. The product varies as regards fusibility with the composition of the original powdered material.

As to the exact nature of the various actions and reactions which ensue on mingling the dolomite with calcium chlorid and then heating at the high temperature described, we are not certain and content ourselves with noting the observed facts. The chlorid of calcium or magnesium is for the most part converted into lime or magnesia as the case may be, very little of the chlorin remaining in the final calcined material. Its presence therefore does not materially alter the analysis of the final product; that is, it does not make the analysis materially different from that of the dolomitic material calcined alone. Nevertheless, there is the remarkable difference noted in the characteristics of the final products here obtained as compared with the materials calcined in any other way.

Instead of using pure dolomite, magnesian limestone may be used. The advantages of this invention are obtained indeed to some extent in treating high calcium limestone. Magnesites of such purity as not to be directly applicable to furnace purposes may be treated by the present method with the production of useful furnace lining materials. Magnesia extracted from dolomite in various ways may also be converted into useful lining materials under the present invention.

In the case of pure magnesia or magnesite, we find it better to use magnesium chlorid as a bonding agent, though the other chlorids may be used. Using pure magnesia and bonding it with magnesium chlorid, the final product is essentially a dense granular vitrified bonded magnesia which may be crushed and pressed into bricks, after moistening with strong magnesium chlorid solution. By burning these bricks in the described manner, there is obtained as a new refractory material a substance consisting of magnesium oxid with no other impurity than a trace of chlorin, and with a melting point approximating that of pure magnesia, namely 2800° C.

What we claim is:—

1. The process of making refractory material of a nature resistant to atmospheric action which comprises moistening a carbonated refractory material with a liquid containing a small amount of a soluble chlorid, drying and calcining at a high temperature, the temperature being finally carried high enough to expel most of the chlorin of the chlorid so added.

2. The process of making refractory material of a nature resistant to atmospheric action which comprises moistening a carbonated refractory material containing magnesia with a liquid containing a small amount of a soluble chlorid, drying and calcining at a high temperature, the temperature being finally carried high enough to expel most of the chlorin of the chlorid so added.

3. The process of making refractory materials which comprises mixing a basic refractory material with a solution of calcium chlorid, drying and heating to a temperature sufficiently high to expel most of the chlorin of the chlorid so added.

4. The process of making refractory materials which comprises mixing a basic refractory material containing magnesia with a solution of calcium chlorid, drying and heating to a temperature sufficiently high to expel most of the chlorin of the chlorid so added.

5. The process of making refractory materials which comprises calcining dolomite in the presence of an added chlorid at a temperature sufficient to expel most of the chlorin present.

6. The process of making refractory materials which comprises calcining dolomite in the presence of calcium chlorid at a temperature sufficient to expel most of the chlorin present.

7. The process of making refractory materials which comprises calcining dolomite in the presence of calcium chlorid at a temperature of about 1500° C. until most of the chlorin is expelled.

8. The process of making refractory materials which comprises calcining dolomite in the presence of calcium chlorid at a temperature of about 1500° C. until most of the chlorin is expelled, cooling, shaping the material into bricks and heating slowly to a temperature of about 1500° C.

9. As a new material, a hard calcined dolomite containing chlorin in amount not over 1 per cent.; said material having otherwise substantially the composition of the ordinary calcined dolomite but being distinguished therefrom by resisting the action of air, steam and hot water.

10. As a new material, a brick of granules of hard calcined dolomite containing chlorin in amount not over 1 per cent.; said material having otherwise substantially the composition of the ordinary calcined dolomite but being distinguished therefrom by resisting the action of air, steam and hot water, said granules being united by sintering of their meeting faces.

11. As a new material, a hard calcined basic refractory containing magnesia and also containing a little chlorin, the amount of chlorin not being over 1 per cent., said material being substantially free of carbon dioxid and resisting the action of air, steam and hot water.

12. As a new material, a brick of granules of a hard calcined refractory material containing magnesia and also containing a little chlorin, the amount of chlorin not being over 1 per cent., said material being substantially free of carbon dioxid and resisting the action of air, steam and hot water.

In testimony whereof, we affix our signatures hereto.

JAMES O. HANDY.
ROBERT M. ISHAM.